(12) United States Patent
Weixel

(10) Patent No.: US 7,376,584 B1
(45) Date of Patent: May 20, 2008

(54) SYSTEMS AND METHODS FOR FULFILLING ORDERS USING LOCATION-BASED ABBREVIATED DIALING

(75) Inventor: James K. Weixel, Ashland, MA (US)

(73) Assignee: Verizon Corporate Services Group Inc., Basking Ridge, NJ (US)

(*) Notice: Subject to any disclaimer, the term of this patent is extended or adjusted under 35 U.S.C. 154(b) by 732 days.

(21) Appl. No.: 09/919,461

(22) Filed: Jul. 31, 2001

(51) Int. Cl.
A63F 17/00 (2006.01)

(52) U.S. Cl. .................................... 705/17; 705/26

(58) Field of Classification Search ............... 705/15, 705/16, 17, 26, 27
See application file for complete search history.

(56) References Cited

U.S. PATENT DOCUMENTS

| | | | |
|---|---|---|---|
| 5,218,367 A | 6/1993 | Sheffer et al. | 342/457 |
| 5,327,144 A * | 7/1994 | Stilp et al. | 342/387 |
| 5,519,760 A | 5/1996 | Borkowski et al. | 379/59 |
| 5,625,668 A | 4/1997 | Loomis et al. | 379/58 |
| 5,815,814 A | 9/1998 | Dennison et al. | 455/456 |
| RE35,916 E | 10/1998 | Dennison et al. | 455/456 |
| 5,850,599 A | 12/1998 | Seiderman | 455/406 |
| 5,991,749 A | 11/1999 | Morrill, Jr. | 705/44 |
| 6,011,975 A | 1/2000 | Emery et al. | 455/456 |
| 6,366,220 B1 * | 4/2002 | Elliott | 340/928 |
| 6,646,659 B1 * | 11/2003 | Brown et al. | 345/811 |
| 2002/0120582 A1 * | 8/2002 | Elston et al. | 705/64 |
| 2002/0143655 A1 * | 10/2002 | Elston et al. | 705/26 |
| 2003/0093334 A1 * | 5/2003 | Barzilay | 705/26 |
| 2004/0177008 A1 * | 9/2004 | Yang | 705/26 |
| 2004/0249497 A1 * | 12/2004 | Saigh et al. | 700/216 |
| 2007/0187183 A1 * | 8/2007 | Saigh et al. | 186/53 |

OTHER PUBLICATIONS allNetDevices; Burger Kings Goes Wireless; Apr. 17, 2001; pp. 1-1.
allNetDevices; Do Consumers Want Location Services?;Aug. 7, 2000; Wireless Data News, vol. 8,No. 16 via COMTEX; pp. 1-2.
P.H. Lewis; Wireless Valhalla: Hints of the Cellular Future; Jul. 13, 2000; New York Times; Section G, p. 1.
J. Low; Putting a Phone Wallet in Your Pocket; Jul. 5, 2000; New Straits Times; Section Focus, p. 11.
C. Honore; Finns Take A Cellphone to New Heights; Nation Proud of 'Silicon Valley of the Wireless Web' Title; May 2, 2000; The National Post; EWORLD, p. C09.

* cited by examiner

Primary Examiner—Ronald Laneau

(57) ABSTRACT

A system (100) configured to facilitate ordering of goods or services from a vendor (150) by a customer may include one or more base stations (130) configured to receive an abbreviated dialing sequence that corresponds to an order from a mobile terminal used by the customer. A processing center (140) may be coupled between the one or more base stations (130) and vendor (150) and may be configured to receive the abbreviated dialing sequence. Processing center (140) may also transmit customer information that relates to the order to vendor (150), and may bill the customer's wireless account for a monetary amount of the order.

31 Claims, 5 Drawing Sheets

SYSTEMS AND METHODS FOR FULFILLING ORDERS USING LOCATION-BASED ABBREVIATED DIALING

BACKGROUND OF THE INVENTION

1. Field of the Invention

The present invention relates generally to wireless communication systems and, more particularly, to systems and methods for ordering goods or services using wireless communication systems.

2. Description of Related Art

Vendors of goods or services have an interest in fulfilling customers' orders efficiently to maximize the number of customers that can be served (and hence the amount of profit) per unit of time. Similarly, customers are also interested in having their orders fulfilled efficiently, to minimize wasting their valuable time (e.g., standing in lines, waiting for delivery of the good or service, etc.). Conventional systems and methods for fulfilling orders have several shortcomings, however, some of which will become apparent in the following example.

Sometimes motorists (i.e., potential customers), for example while on travel, will not stop to get food, because they feel it will take too much time. This problem of missed sales is most commonly encountered on interstate highways, where motorists are often in a hurry and do not want to take time to get out of their vehicles for food. In addition, often the service areas located on highways are crowded with customers, especially during holiday travel. Currently, restaurants cannot anticipate when a customer will arrive. Hence, the restaurants cannot begin working on an order until the customer is at a drive-up window or is placing the order at a walk-up register.

Waiting until a customer arrives to begin taking and filling an order wastes valuable time for both the customer and the restaurant. The restaurant cannot process as many customers within a given time frame as they otherwise might. Customers may become frustrated because they must wait for longer than desired periods of time to have their orders taken and filled. Also, the restaurant risks losing revenue, because the customer, faced with such probable difficulties, may avoid stopping entirely.

As a result, a need exists for systems and methods that facilitate order placement and order fulfillment in a manner that avoids delays inherent in waiting for the physical presence of customers to initiate the process of ordering and fulfilling orders.

SUMMARY OF THE INVENTION

Systems and methods consistent with the present invention address this and other needs by wirelessly placing an order and beginning preparation of the order by a vendor prior to arrival of the customer at the vendor's location. The customer may place a complete order by using an abbreviated dialing sequence. Systems and methods consistent with the present invention may determine the location of the customer within a particular geographic area to facilitate placement of the order with a particular vendor.

In accordance with the purpose of the invention as embodied and broadly described herein, a system configured to facilitate ordering of goods or services from a vendor by a customer may include one or more base stations configured to receive an abbreviated dialing sequence that corresponds to an order from a mobile terminal used by the customer. A processing center may be coupled between the one or more base stations and the vendor and may be configured to receive the abbreviated dialing sequence. The processing center may also transmit customer information that relates to the order to the vendor, and may bill the customer's wireless account for a monetary amount of the order.

In another implementation consistent with the present invention, a method of providing an abbreviated dialing service may include receiving, at an abbreviated dialing processing center, an abbreviated dialing sequence that corresponds to an order from a mobile terminal operated by a customer, and determining a location of the mobile terminal. The method may also include processing the abbreviated dialing sequence and sending customer information to the vendor based on the location of the mobile terminal.

In yet another implementation consistent with the present invention, a method of fulfilling an order from a customer by a vendor, the order being initiated on a mobile terminal before the customer arrives at the vendor, may include receiving abbreviated dialing information and selecting a particular order from the abbreviated dialing information. The method may also include preparing the particular order and providing the particular order to the customer when the customer arrives.

In a further implementation consistent with the present invention, a method of supplying abbreviated dialing service to a vendor may include designating one or more unique abbreviated dialing sequences for the vendor. Upon receiving the one or more unique abbreviated dialing sequences, locations of mobile terminals that initiated the one or more unique abbreviated dialing sequences may be determined. Customer information may be sent to one or more locations of the vendor based on the determined locations.

In yet another implementation consistent with the present invention, a method of providing goods or services to a customer may include establishing an account for the customer and obtaining ordering preferences from the customer. The ordering preferences may be associated with abbreviated dialing codes. The method may also include receiving an abbreviated dialing code from the customer and delivering the goods or services to the customer according to the ordering preferences and the received abbreviated dialing code.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents. Systems and methods consistent with the present invention may interconnect a customer and a vendor using a wireless service provider to facilitate an order made remotely by the customer using an abbreviated dialing sequence. The wireless service provider may receive the abbreviated dialing sequence and may determine the customer's location. Using the customer's location, the wireless service provider may determine to which vendor location to send the customer's information. Upon receipt of the customer's information, the vendor automatically begins processing an order dictated by previously established preferences of the customer. The vendor may bill the customer's wireless account or a credit or debit card for the amount of the order, and the customer may arrive and quickly pick up the order.

Exemplary System Configuration

Figure 1:
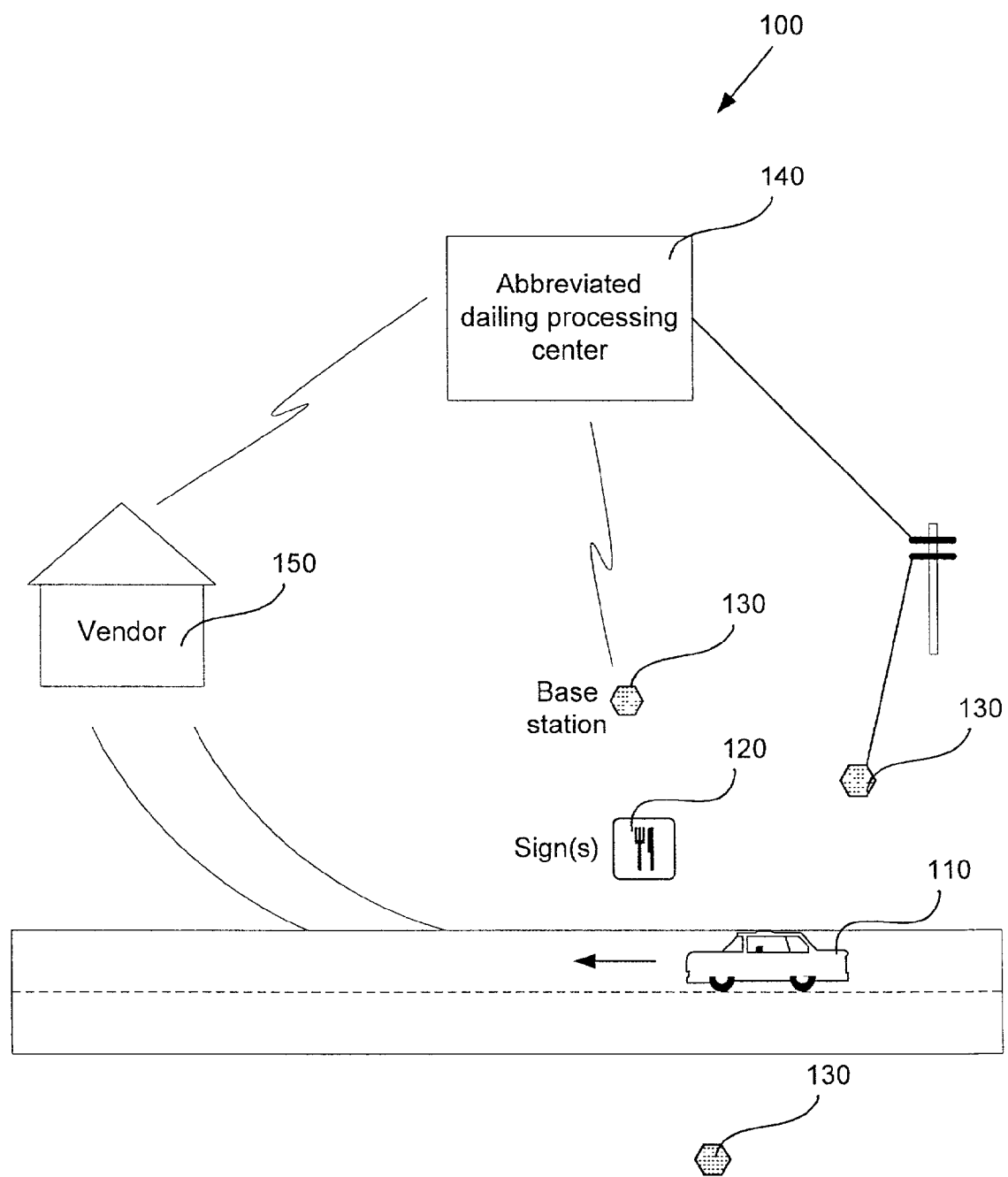
FIG. 1 is a block diagram of an exemplary system that facilitates order placement and fulfillment according to an implementation consistent with the present invention.

FIG. 1 is a diagram of an exemplary system 100 that facilitates order placement and fulfillment according to an implementation consistent with the present invention. System 100 may include a vehicle 110, one or more signs (hereafter "signs") 120, one or more wireless base stations (hereafter "base stations") 130, an abbreviated dialing processing center 140, and a vendor 150. One skilled in the art would recognize that in practice system 100 may include more vehicles, signs, base stations, abbreviated dialing processing centers, and vendors.

Vehicle 110 may contain a customer and a mobile terminal (not shown) that is capable of accessing a wireless communication system. As used herein, the term "vehicle" refers to any mobile vehicle that is capable of carrying the customer, such as a motorcycle, sedan, van, light or heavy truck, bus, etc. Vehicle 110 may travel along a highway (e.g., an interstate highway) that has periodic exits, one of which serves vendor 150. The customer in vehicle 110 may view signs 120 from the highway, and may also choose to exit the highway and visit vendor 150.

Signs 120 may be visible from vehicle 110 and may contain information that is useful for remote ordering by the customer. Signs 120 may be located within a wireless service area of base stations 130. Signs 120 may also be located such that an order for goods or services placed in their vicinity may be ready for delivery when vehicle 110, traveling at an expected rate of speed, reaches vendor 150.

Base stations 130 may include conventional wireless base stations that are capable of transmitting and receiving wireless communication signals (e.g., an order for goods or services) from the mobile terminal in vehicle 110. Base stations 130 may use one or more conventional access protocols, such as Advanced Mobile Telephone System (AMPS), Digital Advanced Mobile Telephone System (DAMPS), Global System for Mobile communication (GSM), Enhanced Data for GSM Evolution (EDGE), and/or Code Division Multiple Access (CDMA).

Base stations 130 may determine the location of vehicle 110 (by locating the mobile terminal) when a certain input occurs (e.g., dialing a certain number, speaking a certain phrase, tapping a certain sequence of key(s), etc.). Base stations 130 may determine the location of vehicle 110 using techniques similar to enhanced 911 (E911) service or using other techniques, such as time delay measurements or global positioning system (GPS) information, if available. Examples of such conventional location determination techniques may be found in U.S. Pat. Nos. 6,011,975 (Method of personal communications service using wireline/wireless integration detecting a predetermined event during process of a call); 5,815,814 (Cellular telephone system that uses position of a mobile unit to make call management decisions); 5,625,668 (Position reporting cellular telephone); 5,519,760 (Cellular network-based location system); 5,218,367 (Vehicle tracking system); and Re. 35,916 (Cellular telephone system that uses position of a mobile unit to make call management decisions). In at least one implementation consistent with the present invention, two base stations 130 are used to locate vehicle 110. In other implementations, more or fewer base stations 130 may be used.

Abbreviated dialing processing center 140 may be maintained by a wireless service provider to operate in conjunction with base stations 130. The abbreviated dialing processing center 140 may connect to base stations 130 and vendor 150 via wired, wireless, or optical connections. In an implementation consistent with the present invention, the abbreviated dialing processing center 140 connects to base stations 130 and/or vendor 150 via a telephone-based connection, possibly, via the Plain Old Telephone System (POTS).

Processing center 140 may be capable of receiving an abbreviated dialing sequence from base stations 130, and interpreting the abbreviated dialing sequence as an order for goods or services for vendor 150. As used herein, an "abbreviated dialing sequence" may include any dialed sequence (e.g., *6) or other message (e.g., text or voice dialing) that is less complicated for the customer in vehicle 110 to generate than, for example, a 7-digit or 10-digit telephone number of vendor 150. Processing center 140 may be capable of passing on either the abbreviated dialing sequence (e.g., when the customer's preferences are stored by vendor 150), or the actual order for goods or services (e.g., when the customer's preferences are stored by processing center 140) to a computer system located at vendor 150. Processing center 140 also may be capable of sending messages (e.g., goods unavailable or out-of-stock) from vendor 150 to base station 130 for transmission to vehicle 110. Further, processing center 140 may be capable of billing a customer's account, for example the customer's wireless account, for the goods or services ordered from vendor 150.

Figure 2:
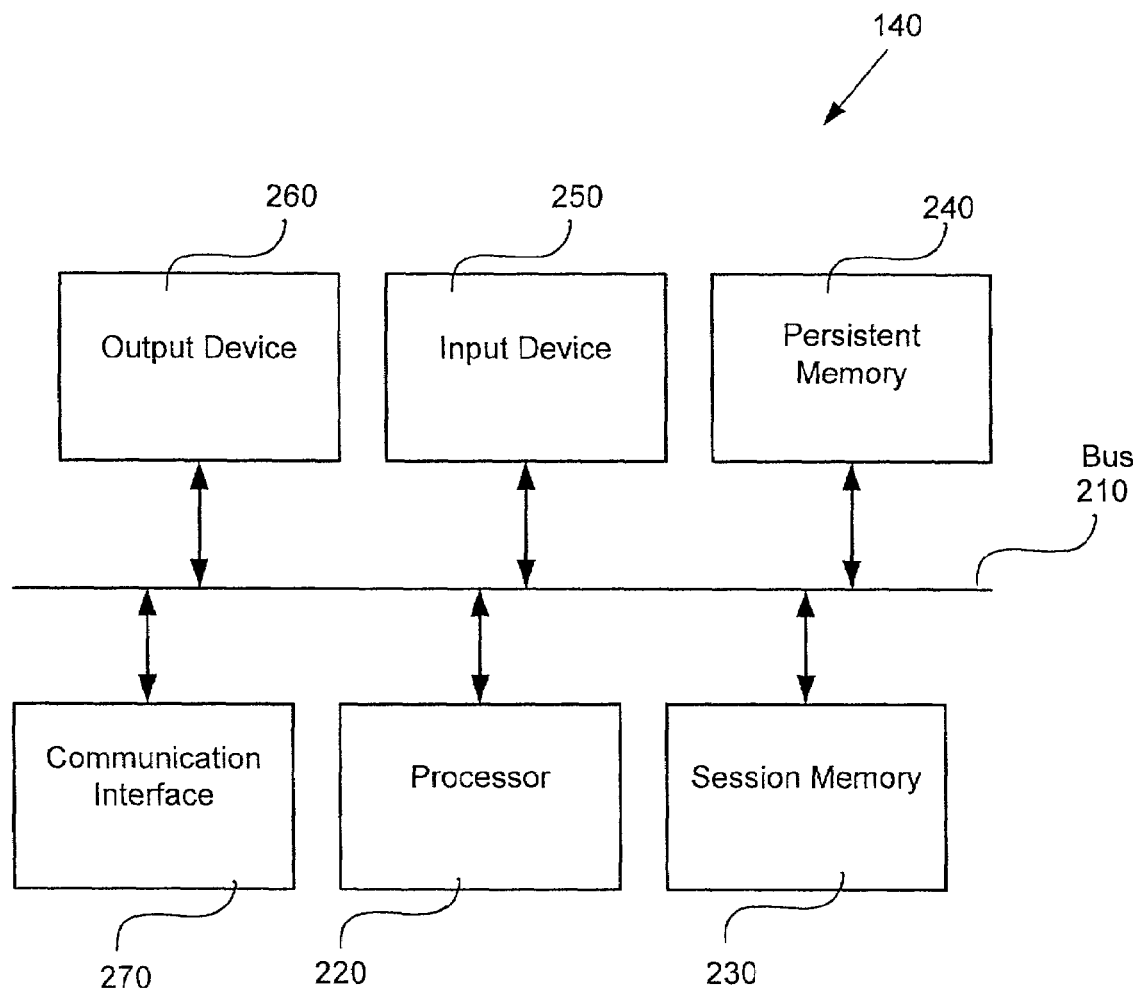
FIG. 2 is an exemplary diagram of an abbreviated dialing processing center according to an implementation consistent with the present invention.

FIG. 2 is an exemplary diagram of an abbreviated dialing processing center 140 according to an implementation consistent with the present invention. One skilled in the art will recognize that other configurations are possible. Processing center 140 may include a bus 210, a processor 220, a session memory 230, a persistent memory 240, an input device 250, an output device 260, and a communication interface 270. Bus 210 permits communication among the components of abbreviated dialing processing center 140. Processor 220 may include any type of conventional processor or microprocessor that interprets and executes instructions. Session memory 230 may include a random access memory (RAM) or another type of dynamic storage device that stores information and instructions for execution by processor 220, and/or a read only memory (ROM) or another type of static storage device that stores static information and instructions for use by processor 220. Persistent memory 240 may include a hard disk, a floppy disk, a CD-ROM, a DVD-RAM, and/or some other type of magnetic or optical recording medium and its corresponding drive. Persistent memory 240 may contain, for example, a database including user preferences, or other user information.

Input device 250 may include one or more conventional mechanisms capable of inputting information into processing center 140, such as a keyboard, a mouse, a pen, voice recognition and/or biometric mechanisms, etc. Output device 260 may include one or more conventional mechanisms capable of outputting information from processing center 140, including a display, a printer, a pair of speakers, etc. Communication interface 270 may include any transceiver-like mechanism that permits processing center 140 to communicate with other devices and/or systems, for example an RF transceiver, a remote database, a remote system, etc.

As described in detail herein, a processing center 140 consistent with the present invention may receive an abbreviated dialing sequence from base stations 130 and transmit user information to vendor 150. Processing center 140 may perform this task in response to processor 220 executing sequences of instructions contained in a computer-readable medium, such as session memory 230. A computer-readable medium may include one or more memory devices and/or carrier waves. The instructions may be read into memory 230 from another computer-readable medium, such as persistent memory 240, or from another device via communication interface 270.

Execution of the sequences of instructions contained in memory 230 causes processor 220 to perform processes that will be described later. Alternatively, hardwired circuitry may be used in place of or in combination with software instructions to implement processes consistent with the present invention. Thus, the present invention is not limited to any specific combination of hardware circuitry and software.

Returning to FIG. 1, vendor 150 may include a retail or wholesale establishment that is capable of receiving an order for (typically commodity) goods or services and fulfilling the order in a timely manner. In one implementation consistent with the present invention, vendor 150 may be a fast-food restaurant. However, vendor 150 may also include other types of establishments such as restaurants, pharmacies, grocery stores, toll-booths, convenience stores, gas stations, and other classes of vendors where a good or service may picked up and a trip continued (i.e., where the vendor is not the final destination). To encourage customers to use the abbreviated dialing service, vendor 150 (e.g., a restaurant chain) may include dedicated drive-up windows for patrons using abbreviated dialing. Vendor 150 may also include hotels, restaurants with waiting lists, entertainment vendors that require tickets (e.g., movie theaters), and other classes of vendors where the vendor is the final destination. In this second class of vendors, the customer may avoid standing in lines or otherwise minimize his/her waiting time. This second (i.e., final destination) class of vendors may charge a nominal fee to the customer for such expedited service.

For either class of vendor, vendor 150 may contain a computer ordering/delivery system to receive and track fulfillment of orders. Many vendors 150 already contain such computer systems, which may be modified/programmed to accommodate expedited delivery of goods and/or services.

Exemplary Process

Figure 3:
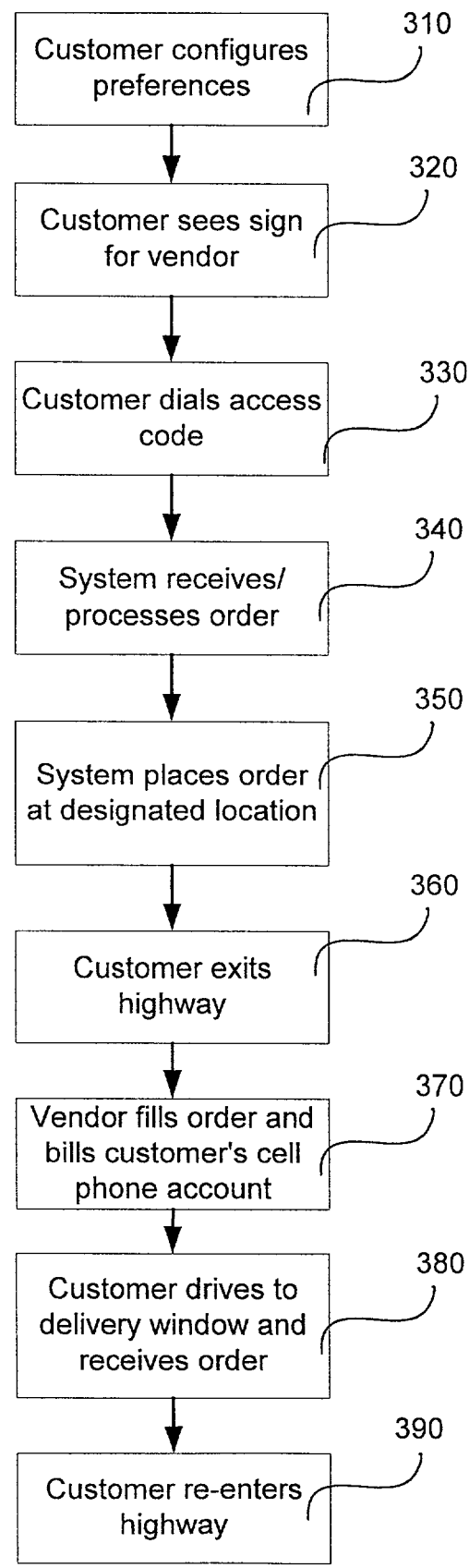
FIG. 3 is a flow chart illustrating an exemplary process to facilitate order placement and fulfillment according to an implementation consistent with the present invention.

FIG. 3 is a flow chart illustrating an exemplary process to facilitate order placement and fulfillment according to an implementation consistent with the present invention. A customer may establish an account and at least one set of preferences (e.g., a menu choice for a restaurant) with a vendor [step 310]. According to one implementation consistent with the invention, the customer may set up the account and preferences over a network, such as the Internet, using a personal computer. Alternately, the customer may use the mobile terminal to set up the account and preferences, either via wireless Internet access or via an interactive voice response (IVR) system. The vendor's web site may employ custom user interfaces for displaying information to a customer. To establish a preference, the customer logs onto the vendor's (e.g., restaurant's) web site and establishes an account. After establishing the account, the customer picks from the vendor's (e.g., restaurant's) offerings and assembles preferred choices (e.g., menu(s)).

Concurrently with establishing the account, the customer's wireless phone information may be associated with the menu preferences. Normally, this may be accomplished in one of two ways: (1) the customer will enter his wireless account information and service provider information while on the vendor's (e.g., restaurant's) web site, or (2) identification (ID) information (i.e., the information that uniquely identifies a mobile terminal) in the customer's mobile terminal will be associated with the vendor account information in the web site.

While traveling on the highway, the customer may see sign 120 for vendor 150 (e.g., restaurant chain) indicating that vehicle 110 is within ordering range [step 320]. Alternately, instead of using a sign to notify customers that they are in range, system 100 may be configured so that the customer's mobile terminal produces a distinctive alert (e.g., ring or alarm) when vehicle 110 comes within range for abbreviated ordering.

After seeing sign(s) 120, the customer may place a call to vendor 150 (e.g., restaurant) using the abbreviated dialing sequence displayed on sign [step 330], or in the case of notifying the customer's mobile terminal, by dialing a predetermined sequence for vendor 150. Alternatively, a customer may place an order or modify an order using an IVR system resident at vendor 150 or processing center 140.

In an implementation consistent with the present invention, the abbreviated dialing may be modified so that an additional digit can be entered to specify a particular order preference. For example, if McDonalds™ uses #M (i.e., #6) as its abbreviated dialing sequence for a customer's default selection, the customer may add an additional digit to form the sequence #61, #62, etc. to designate a variant. For example, the sequence #61 may be the preferred order when the whole family is in the car, while #62 may be an alternate (i.e., non-default) selection of the customer.

One or more base stations 130 receive the abbreviated dialing sequence and relay it to processing center 140. Upon receipt of the abbreviated dialing sequence from base stations 130, abbreviated dialing processing center 140 begins to process the order [step 340]. Such initial processing may include identifying a physical location of vehicle 110 containing the customer and the mobile terminal. This customer location information may be used to determine to which particular vendor 150 vehicle 110 is closest. Presence of sign(s) 120 containing abbreviated dialing information may ensure that a vendor 150 is present within a specified distance of vehicle 110, and hence easily reachable by the customer. However, if the customer location information indicates that vehicle 110 is not within a specified distance of vendor 150, processing center 140 may contact the customer to refuse the abbreviated dialing sequence and/or suggest other options (e.g., driving a greater distance than the specified distance to the specified vendor). The customer location information thus allows a certain abbreviated dialing sequence to be used over an entire service area of a wireless service provider.

Processing center 140 may then send the customer's information to vendor 150 [step 350]. If the customer's preferences are stored at vendor 150, then processing center 140 may transmit, for example, customer identification information (e.g., wireless account number or mobile terminal ID number) and the abbreviated dialing sequence. If the preferences are stored at processing center 140, processing center 140 may associate the customer's mobile unit and the particular sequence dialed with her preferences and transmit the order to vendor 150. Processing center 140 may also bill the customer's wireless account for the amount of the order at this time. Alternatively, processing center 140 may wait for a "handshake" notification from vendor 150 signifying that the order has been filled before billing the customer's account. In addition, processing center 140 may be configured to send the customer an e-mail message whenever an order is processed. Using the e-mail notification enables a customer to identify and correct erroneous charges to the wireless account in a timely manner. Meanwhile, vehicle 110 exits the highway and proceeds toward vendor 150 [step 360].

Vendor 150 (e.g., restaurant) receives the call from processing center 140 and automatically begins processing the order [step 370]. The vendor may associate the customer identification information with the customer's preferences to generate the order. The customer does not necessarily have to talk into the phone (unless voice dialing and/or voice recognition is used by processing center 140), and no human interaction is necessary on, for example, the restaurant's part other than the labor required for actually cooking and assembling a meal. Upon receipt of the call, the vendor's (e.g., restaurant's) computer system may place the appropriate charges onto the customer's cellular phone bill or credit or debit card. One manner of placing such charges on the customer's cellular phone bill is for vendor 150 to send such charges to the wireless service provider, who places the charges on the customer's cellular phone bill.

Vendor 150 may prepare the customer's order (e.g., meal) so that it is ready for pick up when vehicle 110 arrives at, for example, a drive-up window. The customer arrives at vendor 150 and picks up the order without the need to tender payment [step 380]. Along with the order, a receipt may be included, detailing the order and amount billed to the customer's cell phone account, credit card, or debit card. Vehicle 110 may then re-enter the highway and resume the trip without additional delay [step 390].

Exemplary Business Methods

Figure 4:
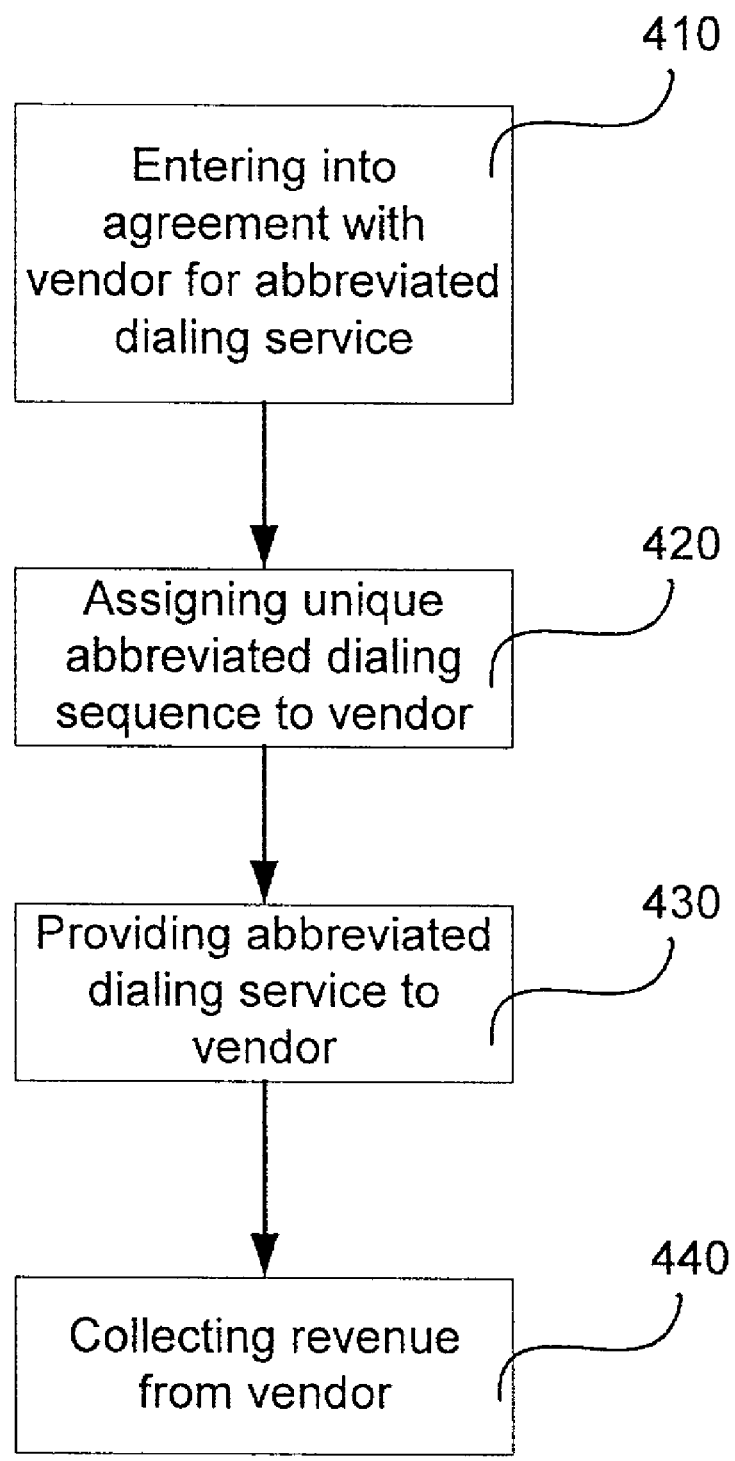
FIG. 4 is a flow chart illustrating an exemplary method of providing abbreviated dialing service to vendors according to an implementation consistent with the present invention.

FIG. 4 is a flow chart illustrating an exemplary method of providing abbreviated dialing service to vendors according to an implementation consistent with the present invention. Having set up an abbreviated dialing processing center 140 as described above, a wireless service provider may enter into an agreement with vendor 150 to subscribe to the abbreviated dialing service [step 410]. The wireless service provider may provide vendor 150 (e.g., restaurant chain) with a unique abbreviated dialing sequence that will work anywhere within the wireless provider's service area [step 420]. For example McDonalds™ may be given #M (i.e. #6), Burger King™ can be given #B (i.e. #2), etc. The abbreviated dialing sequence can be as short as one digit, although normally it may be more prudent for it to be two or more digits. Alternatively, the abbreviated dialing sequence may be a single, easy-to-remember number to access the dialing service for all vendors (e.g., #O, for Order), which may be followed by either another digit or a spoken phrase to designate a particular vendor.

Once a vendor is assigned an abbreviated sequence, the wireless service provider may facilitate abbreviated ordering as described above with regard to FIG. 2 [step 430]. The service provided to vendor 150 may include charging the customer's wireless account, credit card, or debit card for the amount of the goods or services ordered, as described above. As specified in the agreement, the wireless service provider may collect revenue from vendor 150 for providing the abbreviated dialing service [step 440]. The revenue may be provided to the wireless service provider by vendor 150 on a fixed-fee basis, a per-transaction basis, a periodic basis, or any other fee arrangement or combination of arrangements conventionally practiced by businesses.

Figure 5:
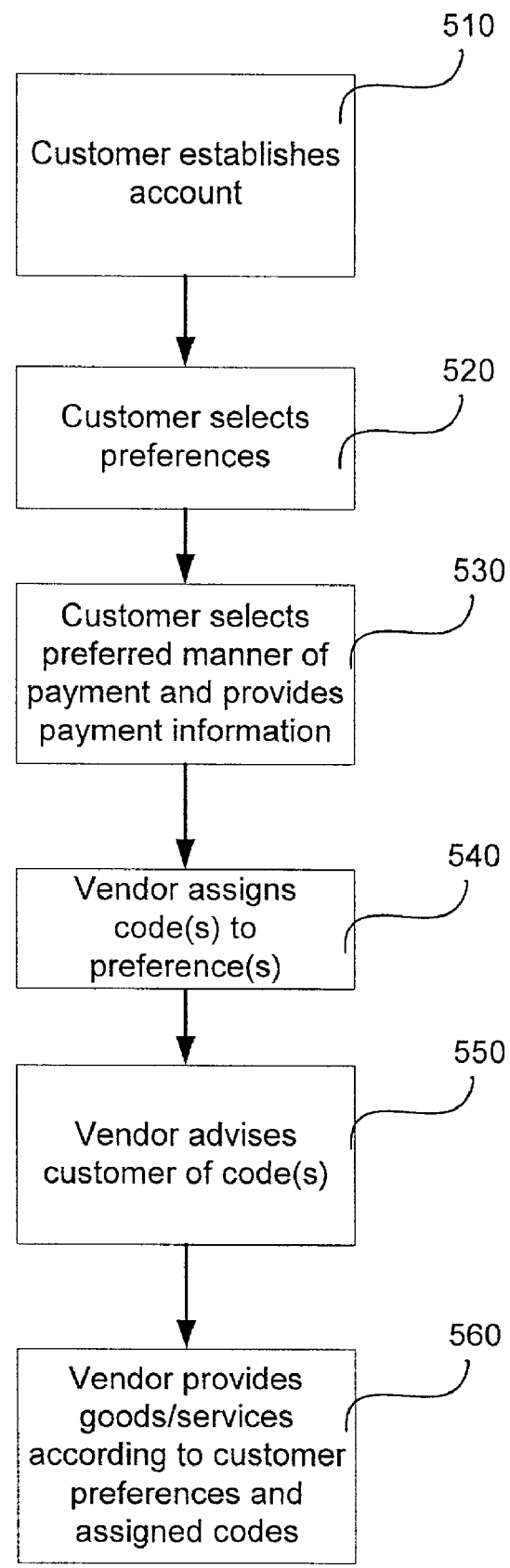
FIG. 5 is a flow chart illustrating an exemplary method of providing goods and/or services to customers using abbreviated dialing according to an implementation consistent with the present invention.

FIG. 5 is a flow chart illustrating an exemplary method of providing goods and/or services to customers using abbreviated dialing according to an implementation consistent with the present invention. A customer may establish an account with a vendor 150 [step 510]. According to one implementation consistent with the invention, the customer may set up the account and preferences over a network, such as the Internet, using a personal computer. The vendor's web site may employ custom user interfaces for displaying information to a customer. Alternately, the customer may use the mobile terminal or a telephone to set up the account and preferences, either via wireless Internet access or via an interactive voice response (IVR) system.

To establish preference(s), the customer picks from the vendor's (e.g., restaurant's) offerings and assembles preferred choices (e.g., menu(s)) [step 520]. The preferences may include one default choice that is most preferred by the customer, as well as other, non-default choices. The customer may also specify a preferred payment method [step 530]. The customer may request that his/her wireless account be charged by vendor 150 for any purchases. Alternately, the customer may wish a credit or debit card to be charged. In addition to specifying the manner of payment, the customer may provide identification information (e.g., a wireless account number, or an identification number of his/her mobile terminal) so that a remotely-placed order may be rapidly associated with the customer's account and preferences.

When the customer has provided complete enrollment information, vendor 150 may assign one or more abbreviated dialing sequences or codes to the customer's preferences [step 540]. Vendor 150 may advise the customer of the assigned sequences or codes [step 550]. The information provided by the vendor may be provided visually, with or without an accompanying e-mail message for future reference. Mnemonics (e.g., #M for McDonalds™) may be employed by the vendor to aid the customer's future recall of the abbreviated dialing sequence. Vendor 150 may then provide goods and/or services to the customer according to the customer's preferences and assigned codes/sequences as described above [step 560].

Accordingly, the invention may advantageously allow wireless service providers to increase revenue by offering specialized services to commercial vendors of goods and services. The invention also may advantageously allow increased revenue for the vendors, because they can process more customer orders in a given amount of time. Increased order accuracy may also result, because the risk of a teller misunderstanding the customer is lessened. Further, the invention may advantageously save customers' time and allow purchases without cash on hand. For business travelers, for example, the time savings may result in increased profits, because less time is wasted.

It will be apparent to those skilled in the art that various modifications and variations can be made in the abbreviated dialing systems and methods described herein without departing from the spirit or scope of the invention. For example, although one implementation of the invention was described with respect to a vehicle traveling down a highway, other implementations may include using abbreviated dialing to "order ahead," for example, at lunchtime. Along these lines, the customer and the mobile terminal need not be located in a vehicle 110. The customer may be in a building (e.g., home or office), walking on foot, or riding a bicycle when using the abbreviated dialing service. Also, the order of the various steps shown in FIGS. 3-5 should not be construed as essential to the practice of the invention described herein. It is envisioned that the systems and methods described herein may be used generally to minimize a customer's wait time by time-shifting preparation of the order by the vendor to coincide with the customer's transit time, according to the principles outlined above.

Further, pre-establishing an account and preferences with vendor 150 may be avoided by, for example, configuring processing center 140 to send a list of nearby vendors (either by voice or by text) to a customer upon request. The customer may then order from a selected vendor using, for example, a short list of choices. This initial order may establish, for example, a temporary account with the vendor, which the customer later may convert to a permanent account by e-mail. Such an alternate scheme would further save the customer time by avoiding pre-registering, while allowing for "impulse" purchases.

Moreover, although described in terms of a processing center 140, the functionality of processing center 140 (e.g., locating mobile terminals and sending customer information to an appropriate vendor) may be shifted to one or more of base stations 130. Hence, processing center 140 in FIG. 1 may be eliminated in an alternate implementation consistent with the invention.

The present invention is described herein in the context of a mobile terminal. As used herein, the term "mobile terminal" may include a cellular radiotelephone with or without a multi-line display; a personal communications system (PCS) terminal that may combine a cellular radiotelephone with data processing, facsimile and data communications capabilities; a personal digital assistant (PDA) that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

In addition, the present invention is described herein in the context of specific cellular access protocols, namely EDGE, DAMPS, and AMPS. It should be understood that the principles of the present invention may be applied to any cellular or wireless system using other air interfaces, such as GSM, TDMA, CDMA or FDMA. It should be further understood that the principles of the present invention may be used in hybrid systems that are combinations of two or more of the above air interfaces. In addition, a mobile terminal, in accordance with the present invention, may be designed to communicate with a base station transceiver using any standard based on GSM, TDMA, CDMA, FDMA, a hybrid of such standards or any other standard. Thus, it is intended that the present invention cover the modifications and variations of the invention provided that they come within the scope of the appended claims and their equivalents.

What is claimed is:

1. A system configured to facilitate ordering of goods or services by a customer from a vendor having multiple vendor locations while the customer is on travel, the system comprising:

one or more base stations configured to receive an abbreviated dialing sequence that corresponds to an order from a mobile terminal used by the customer, both the order being initiated at a remote location by the customer and preparation of the order being initiated at one of the vendor locations by the vendor before the customer arrives at the one of the vendor locations, to reduce wait time of the customer by time-shifting preparation of the order by the vendor to coincide with transit time of the customer; and a processing center coupled between the one or more base stations and the vendor and configured to receive the abbreviated dialing sequence, determine from the remote location the one of the multiple vendor locations to which to transmit customer information, and bill a wireless account of the customer for a monetary amount of the order;

wherein the goods or services are selected from the group of vendors consisting of restaurants, pharmacies, grocery stores, toll booths, convenience stores and gas stations which allows the goods or services to be picked-up by the customer and the travel to continue while utilizing the goods or services.

2. The system of claim 1, wherein the customer information transmitted to the vendor includes:

an account number of the wireless account or an identification number of the mobile terminal, and the abbreviated dialing sequence.

3. The system of claim 1, wherein the processing center includes:

a database containing preferences of the customer for at least one vendor, and wherein the customer information transmitted to the vendor includes:

the customer's wireless account number or an identification number of the customer's mobile terminal, and information designating the order obtained from the database.

4. The system of claim 1, further comprising:

one or more signs that provide a name or logo of the vendor and the abbreviated dialing sequence corresponding to the vendor.

5. The system of claim 1, wherein the one or more base stations and the processing center are configured to determine a location of the mobile terminal used by the customer.

6. The system of claim 1, wherein the customer is a motorist.

7. A method of providing abbreviated dialing service for a customer ordering goods or services from a vendor having multiple vendor locations while the customer is on travel, the method comprising:

receiving, at an abbreviated dialing processing center, an abbreviated dialing sequence that corresponds to an order from a mobile terminal operated by the customer;

determining a location of the mobile terminal when the sequence was received; and processing the abbreviated dialing sequence and sending customer information to one of the vendor locations based on the location of the mobile terminal, wherein both the order being initiated at the location of the mobile terminal by the customer and preparation of the order being initiated at the one of the vendor locations by the vendor before the customer arrives at the one of the vendor locations, reduces wait time of the customer by time-shifting preparation of the order by the vendor to coincide with transit time of the customer and wherein the goods or services are selected from the group of vendors consisting of restaurants, pharmacies, grocery stores, toll booths, convenience stores and gas stations which allows the goods or services to be picked-up by the customer and the travel to continue while utilizing the goods or services.

8. The method of claim 7, wherein said processing the abbreviated dialing sequence and sending customer information includes:
   sending a wireless account number of the customer or an identification number of the mobile terminal, and
   sending the abbreviated dialing sequence.

9. The method of claim 7, further comprising:
   storing order preferences of the customer, and
   wherein said processing the abbreviated dialing sequence and sending customer information includes:
      sending a wireless account number of the customer or an identification number of the mobile terminal,
      obtaining information designating the order from the stored preferences, and
      sending the information designating the order.

10. The method of claim 7, wherein said processing the abbreviated dialing sequence includes:
    identifying the one of the multiple vendor locations that is most convenient to the customer based on the determined location of the mobile terminal.

11. The method of claim 7, wherein said determining includes:
    receiving a unique abbreviated dialing sequence, and
    inferring the location of the mobile terminal based on the received unique abbreviated dialing sequence.

12. The method of claim 7, said determining includes:
    calculating the location of the mobile terminal based on signal information received at one or more base stations.

13. The method of claim 12, wherein the signal information includes one of time delay information and global positioning system (GPS) information.

14. The method of claim 7, further comprising:
    billing a wireless account of the customer for a monetary amount of the order.

15. The method of claim 7, further comprising:
    billing a credit or debit card of the customer for a monetary amount of the order.

16. A method of fulfilling an order from a customer by a vendor having multiple vendor locations, the order being initiated on a mobile terminal while the customer is on travel before the customer arrives at one of the multiple vendor locations, comprising:
    receiving abbreviated dialing information at the vendor, the abbreviated dialing information being received at the vendor based on a location of the mobile terminal;
    determining the one of the multiple vendor locations to which to transmit customer information relating to the order based on the location of the mobile terminal;
    selecting a particular order from the abbreviated dialing information;
    preparing the particular order; and
    providing the particular order to the customer when the customer arrives;
    wherein both the order being initiated at the location of the mobile terminal by the customer and preparation of the order being initiated at the one of the vendor locations by the vendor before the customer arrives at the one of the vendor locations, reduces wait time of the customer by time-shifting preparation of the order by the vendor to coincide with transit time of the customer and
    wherein the goods or services are selected from the group of vendors consisting of restaurants, pharmacies, grocery stores, toll booths, convenience stores and gas stations which allows the goods or services to be picked-up by the customer and the travel to continue while utilizing the goods or services.

17. The method of claim 16, further comprising:
    obtaining customer preferences from the customer; and
    storing the customer preferences.

18. The method of claim 17, wherein the customer preferences include at least one default order.

19. The method of claim 16, wherein said receiving includes:
    receiving a wireless account number of the customer or an identification number of the mobile terminal, and
    receiving an abbreviated dialing sequence.

20. The method of claim 16, further comprising:
    charging a wireless account of the customer for a monetary amount of the order.

21. The method of claim 16, further comprising:
    charging a credit or debit card of the customer for a monetary amount of the order.

22. The method of claim 16, wherein said selecting includes:
    selecting a particular order based on the abbreviated dialing information and stored customer preferences.

23. A method of supplying abbreviated dialing service to a vendor having multiple vendor locations, comprising:
    designating one or more unique abbreviated dialing sequences for the vendor to facilitate remote ordering of goods or services by customers of the vendor while each of the customers is on travel;
    receiving the one or more unique abbreviated dialing sequences;
    determining locations of mobile terminals that initiated the received one or more unique abbreviated dialing sequences to obtain determined locations; and
    sending customer information to one or more of the multiple vendor locations based on the determined locations;
    wherein both the remote ordering being initiated at the determined locations by the customers and preparation responsive to the remote ordering being initiated at the one or more of the multiple vendor locations by the vendor before the customers arrive at the one or more of the multiple vendor locations, reduce wait time of the customers by time-shifting preparation of orders by the vendor to coincide with transit times of the customers and
    wherein the goods or services are selected from the group of vendors consisting of restaurants, pharmacies, grocery stores, toll booths, convenience stores and gas stations which allows the goods or services to be picked-up by the customer and the travel to continue while utilizing the goods or services.

24. The method of claim 23, further comprising:
entering into an agreement with the vendor to provide the abbreviated dialing service to the vendor.

25. The method of claim 24, further comprising:
collecting revenue from the vendor according to the agreement.

26. The method of claim 23, further comprising:
charging wireless accounts of the customers for monetary amounts of orders placed by the customers.

27. A system configured to facilitate ordering of goods or services by a customer from a vendor having multiple vendor locations while the customer is on travel, the system comprising:
means for receiving an abbreviated dialing sequence that corresponds to an order from a mobile terminal used by the customer;
means for determining a location of the mobile terminal used by the customer during operation of the receiving means;
means, using the determined location, for determining the one of the multiple vendor locations to which to transmit customer information relating to the order; and
means for transmitting the customer information relating to the order to the one of the multiple vendor locations based on the determined location of the mobile terminal;
wherein, both the order is initiated at the determined location by the customer and preparation of the order is initiated at the one of the multiple vendor locations by the vendor before the customer arrives at the one of the multiple vendor locations, to reduce wait time of the customer by time-shifting preparation of the order by the vendor to coincide with transit time of the customer and
wherein the goods or services are selected from the group of vendors consisting of restaurants, pharmacies, grocery stores, toll booths, convenience stores and gas stations which allows the goods or services to be picked-up by the customer and the travel to continue while utilizing the goods or services.

28. The system of claim 27, further comprising:
means for billing a wireless account of the customer for a monetary amount of the order.

29. A method of providing goods or services by a vendor having multiple vendor locations to a customer while the customer is on travel, the method comprising:
establishing an account for the customer;
obtaining ordering preferences from the customer;
associating the ordering preferences with abbreviated dialing codes;
receiving an abbreviated dialing code from the customer while being located remotely from the vendor and determining, on the basis of the remote location, one of the multiple vendor locations for the customer; and
delivering the goods or services to the customer according to the ordering preferences and the received abbreviated dialing code at the one of the multiple vendor locations;
wherein, both the order is initiated at the remote location by the customer and preparation of the order is initiated at the one of the multiple vendor locations by the vendor before the customer arrives at the one of the multiple vendor locations, to reduce wait time of the customer by time-shifting preparation of the order by the vendor to coincide with transit time of the customer and
wherein the goods or services are selected from the group of vendors consisting of restaurants, pharmacies, grocery stores, toll booths, convenience stores and gas stations which allows the goods or services to be picked-up by the customer and the travel to continue while utilizing the goods or services.

30. The method of claim 29, further comprising:
advising the customer of the abbreviated dialing codes associated with the ordering preferences.

31. The method of claim 29, wherein said obtaining includes:
acquiring a preferred manner of payment from the customer.

* * * * *